Feb. 23, 1965  R. W. BLACK  3,170,530
MOBILE AIR SUPPORTED VEHICLE
Filed March 23, 1961  6 Sheets-Sheet 1

INVENTOR.
RICHARD W. BLACK
BY

Feb. 23, 1965  R. W. BLACK  3,170,530
MOBILE AIR SUPPORTED VEHICLE
Filed March 23, 1961  6 Sheets-Sheet 2

INVENTOR.
RICHARD W. BLACK

Feb. 23, 1965  R. W. BLACK  3,170,530
MOBILE AIR SUPPORTED VEHICLE
Filed March 23, 1961  6 Sheets-Sheet 3
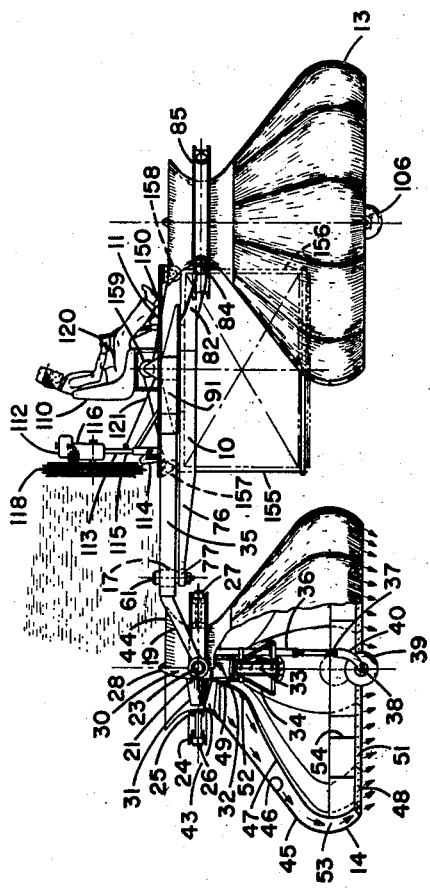
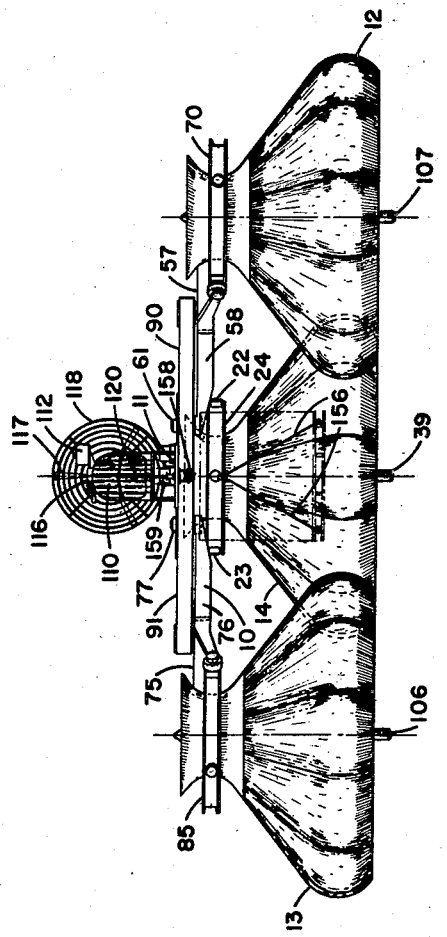
INVENTOR.
RICHARD W. BLACK Feb. 23, 1965  R. W. BLACK  3,170,530
MOBILE AIR SUPPORTED VEHICLE
Filed March 23, 1961  6 Sheets-Sheet 5

INVENTOR.
RICHARD W. BLACK
BY

Feb. 23, 1965  R. W. BLACK  3,170,530
MOBILE AIR SUPPORTED VEHICLE
Filed March 23, 1961  6 Sheets-Sheet 6

INVENTOR.
RICHARD W. BLACK
BY

3,170,530
MOBILE AIR SUPPORTED VEHICLE
Richard W. Black, 700 Jackson Drive,
Williamsburg, Va.
Filed Mar. 23, 1961, Ser. No. 97,976
13 Claims. (Cl. 180—7)
(Granted under Title 35, U.S. Code (1952), sec. 266)

The invention described herein may be manufactured and used by or for the Government for governmental purposes without the payment of any royalty thereon.

This invention relates to mobile, air supported vehicles of the character generally referred to as ground effect machines.

Several experimental vehicles of the character indicated have been constructed and tested but none have achieved sufficient success to be put to use. While all such machines operate on the same general principles they may be roughly divided into two main classes or groups, those that include a plenum chamber and depend for lift on maintaining in the plenum chamber an air pressure slightly above atmospheric pressure, and those having a series of jet orifices, or a continuous jet orifice, around the bottom edge. There have also been combinations of these two types but in all cases the machine or vehicle has had a single hollow body.

In the plenum chamber type, air under pressure for the plenum chamber is supplied by a fan usually mounted in an opening in the top wall of the body and driven by an aircraft type engine. The air pressure lifts the body slightly above the supporting surface, such as the ground or the surface of a body of water, and the air escapes through the narrow space between the bottom edge of the body and the supporting surface. A labyrinth air passage may be provided around the lower edge of the body to retard peripheral air loss. Because of the compression of the air against the supporting surface and reaction and rebound of downwardly directed air from this surface (ground effect) the vehicle can be lifted a slight distance above the ground by an amount of engine power that is only a small part of the power required to actually fly a vehicle of the same weight.

In the jet type the lift is obtained by direct reaction of peripheral air jets against the underlying surface.

Up to the present, however, there appear to be disadvantages to the ground effects vehicle which tend to offset any advantage gained by the reduced power requirements. In the machines that have been operated to date the volume of air provided is such that only a very narrow gap, measured in inches, can be maintained between the bottom edge of the machine and the supporting surface. Even though a skirt of flexible material is provided around the bottom edge of the machine, the machine is not able to negotiate an obstruction of more than a very few inches in height and hence, cannot travel over rough terrain or over waves of appreciable size. Since the bodies of all ground effects machines so far constructed are unitary and rigid, such a machine is required to operate with its bottom edge substantially in a horizontal plane as otherwise the weight of the machine will tend to cause it to slide down hill on its supporting air column. Theoretically such a machine should be able to negotiate moderate grades when provided with a propulsive facility but it has been found that any condition under which the volume of air escaping at one location around the bottom edge exceeds the volume escaping at other locations, as when the machine is passing over uneven ground contours, creates disparities in the side thrust around the machine resulting in erratic movements and loss of lift.

Since the machine, when in its airborne condition, has no part in contact with the ground, directional control is very poor or altogether lacking and the machine is easily diverted from a steered course by uneven side thrust or cross winds and also has a tendency to slide downwardly along any inclined ground surface.

It has also usually been the case that, in order to accommodate the necessary fan diameter and provide some degree of rolling stability, the bodies of these vehicles have been considerably wider than normal highway vehicles. This renders it generally difficult to move such vehicles along highways as part of the normal highway traffic.

In view of the above and other considerations, it is an object of the present invention to provide a ground effects machine or vehicle in which the power driven mechanism for supplying air under pressure is divided into a plurality of separate units each of which is smaller than the unit of a machine having a single unit or even than either unit of a machine having two air supply units. In the arrangement herein disclosed there are three independent air supply units to provide a stable support for the vehicle, but a greater number of units could be utilized if desired.

Another object resides in the provision of an improved ground effects vehicle having a plurality of power units supported on a frame having components so arranged and interconnected that the width of the machine can be reduced for highway or rail transportation and extended to provide the desired stability in operation.

A further object resides in the provision of an improved ground effects machine having a plurality of lift units and a lift unit supported frame so arranged that the lift units may operate at different levels and angles relative to each other while maintaining the planes of their bottom edges substantially parallel to the contiguous ground contour in each case.

A still further object resides in the provision of an improved ground effects machine having vertically movable, ground engaging elements at the rear to provide directional control when the machine is in motion.

An additional object resides in the provision of an improved ground effects machine which can be self-propelled and guided along a wire or cable in cases where it is necessary to repeatedly transverse the same area.

Yet another object resides in the provision of an improved ground effects machine having a plurality of lift units each of which comprises a double walled skirt of fabric material with the space between the walls inflated to resiliently maintain the shape of the skirt so that the skirts are easily deformable upon encountering an obstacle.

It is also an object of the invention to provide an improved ground effects machine having propulsion and steering means which operate independently of the lift means to provide positive propulsion and steering control for the device.

Other objects and advantages will become apparent from a consideration of the following description and the appended claims in conjunction with the accompanying drawings wherein;

FIG. 3 is a side elevational view of the vehicle with a portion broken away and shown in cross section to better illustrate the construction of that portion of the vehicle;

FIG. 4 is a front elevational view of the vehicle;

Figure 1:
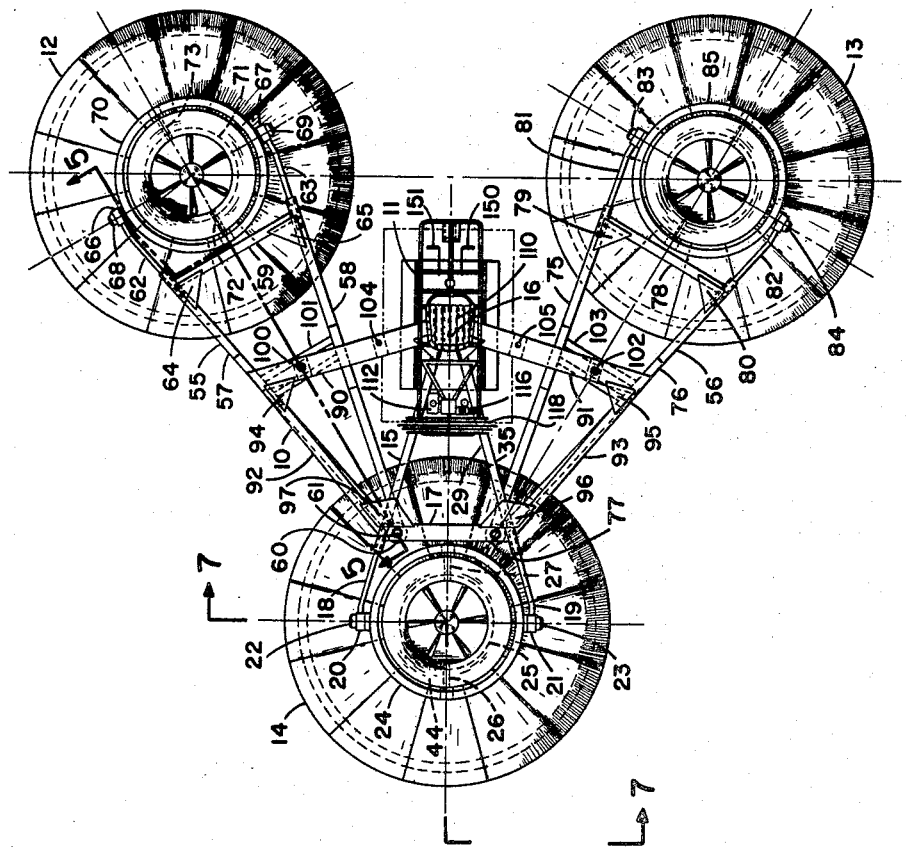
FIG. 1 is a top plan view of a ground effects vehicle illustrative of the invention, with the vehicle in operative condition.

With continued reference to the drawings, the vehicle has a frame, generally indicated at 10, carrying a platform, generally indicated at 11, and supported by lift units, generally indicated at 12, 13 and 14.

The frame comprises three arms 35, 55 and 56 of triangular shape of which the rear or center arm 35 comprises two side members 15 and 29 which diverge rearwardly from a front meeting point 16 symmetrically of the longitudinal center line of the arm. Intermediate the length of the side members 15 and 29 a cross member 17 extends across the space between the two side members and is joined at its ends to the side members to provide an A-frame construction. Extensions 18 and 19 project from the rear ends of the side members 15 and 29. At their rear ends the extensions 18 and 19 are provided with enlarged, apertured formations 20 and 21 which receive journal bolts 22 and 23 respectively. At their inner ends these bolts 22 and 23 are received in diametrically opposite bearing formations provided in an outer gimbal ring 24, so that the gimbal ring is tiltable about an axis extending diametrically of the ring and at right angles to the longitudinal center line of the rear frame arm. An inner gimbal ring 25 is disposed within the outer ring 24 and mounted on journal bolts 26 and 27 disposed 90° circumferentially of the outer ring from the bolts 22 and 23. The inner ring is thus tiltable about a diametrical axis which lies in a vertical plane which includes the longitudinal center line of the rear frame arm 35.

As shown in FIG. 3, a power operated lift fan unit, generally indicated at 28, is disposed within and mounted on the inner gimbal ring 25. This lift fan unit comprises a fan hub 30 carrying fan blades 31, and a suitable power plant, such as a gasoline engine 33, disposed below and drivingly connected to the fan. The engine has a cylindrical extension 32 immediately below the fan hub 30 and is mounted on a suitable engine mounting frame 34 which is supported from the fan shroud 44 by radially disposed fixed vanes 43.

A telescopic strut 36 is secured at its upper end to the engine mounting frame 34 and extends below this frame. At its lower end this strut carries a fork 40 with bearings receiving an axle 38. A ground wheel 39 is journalled on the axle 38 between the two legs of the fork 40 and the telescopic strut 36, applies downward pressure resiliently on the wheel 39. The wheel is locked against castering movements by the toggle linkages 37.

The fan is surrounded by an annular fan shroud or duct 44 shaped to provide a restricted throat portion immediately surrounding the fan blades, and upper and lower ends having diameters greater than the diameter of the intermediate throat portion. This annular fan duct is rigidly mounted in the inner gimbal ring 25. The lift unit 14 also includes a skirt 45 extending below the fan to receive the downward flow of air from the fan and confine this air in a manner to raise its pressure above that of the atmosphere before the air escapes between the bottom edge of the skirt and the ground.

This skirt 45, is made of a pliable material, such as a suitable fabric or coated fabric, and comprises an outer annular wall 46 and an inner annular wall 47. The outer wall 46 is secured at its upper end to the lower portion of the fan shroud 44 and is made in tapered panels, suitably secured together, which give to the skirt a bell-shaped form.

At its lower edge the outer wall 46 is secured to the outer circumference of a circular member 48 of flexible or pliable material. This circular or ring like member is provided with a series of tubular grommets or nozzles 51 extending therethrough at uniformly spaced apart locations therearound to direct air blasts downwardly from the interior of the skirt.

At its upper end the inner wall 47 is secured to a fixed cylindrical ring 49 which surrounds and is secured to the engine extension 32 or other suitable structure, and at its lower edge this inner wall is secured to the inner circumference of the ring member 48.

The fan shroud 44 and the ring 49 are concentric and the radial distance between these parts is substantially equal to the length of the fan blades 31 so that all of the air flow produced by the fan is forced through the annular chamber between the outer wall 46 and the inner wall 47 of the skirt 45.

The inner wall is provided in its upper portion with apertures 52 through which a sufficient quantity of air flows to cool the engine 33. This arrangement maintains the skirt inflated by air at a pressure above the pressure of the atmosphere to maintain the bell-shaped form of the skirt and also maintains the engine at the proper operating temperature. The inner and outer walls are held in the proper relationship to give the desired shape to the skirt and to the annular air chamber by a series of fabric partitions or diaphragms 53 which extend between the inner and outer walls of the skirt and from near the upper end substantially to the lower end of the skirt. The longitudinal edges of these fabric partitions are preferably sewed into the seams between adjacent panels of the outer and inner walls of the skirt and the transverse edges of the partitions are suitably reinforced.

Figures 7, 10:
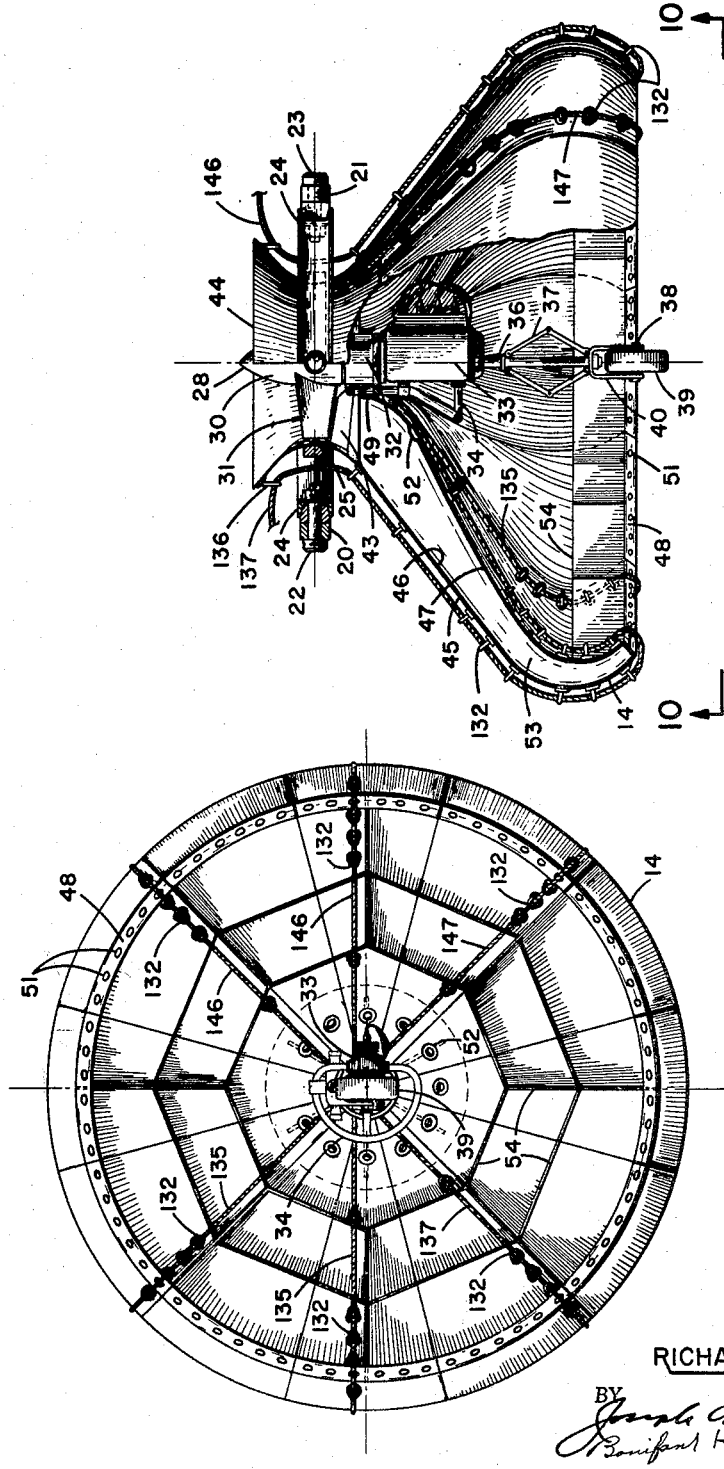
FIG. 7 is a fragmentary cross sectional view substantially on a plane indicated by the line 7—7 of FIG. 1.
FIG. 10 is a bottom view showing the arrangement of vertical webs or baffles for breaking up undesirable air currents.

A suitable air directing or air straightening structure is provided in the lower end of the skirt. This structure extends over the entire area within the bottom of the skirt and is formed by interconnected, vertical webs 54 which divide the area into a plurality of similarly shaped cells, as shown in FIG. 10.

The air under pressure in the annular inflation chamber between the outer and inner walls of the skirt escapes at a predetermined rate through the apertures or nozzles 51 in the bottom of ring 48. These jets of air under pressure, acting between the bottom ring 48 and the ground, provide a lift which maintains the bottom ring above and clear of the ground. The bottom ring 48 is radially inclined inwardly and upwardly so that the air jets issuing through the nozzles 51 are inclined downwardly and inwardly. This direction of the jets forces air under pressure into the space within the inner wall of the skirt to provide a plenum chamber effect in which the lift unit rides on a cushion of air having a pressure somewhat above atmospheric pressure. The inward direction of the air jets also retards the escape of air outwardly through the space between the bottom ring 48 and the ground when the lift unit is operating.

The forwardly directed arm 55 on the left hand side of the vehicle comprises a pair of side members 57 and 58 diverging symmetrically of the longitudinal center line of the arm from a juncture at the rear end of the arm. Near their forward ends the members 57 and 58 are joined by a cross member 59 providing an A-frame construction for the arm.

The connections between the side members 57 and 58 and the cross member 59 are reinforced by suitable gusset plates 64 and 65 and this construction is employed in all of the frame arms. At their rear or convergent ends the longitudinal members 57 and 58 are jointed to a cylindrical sleeve or bushing 60. A journal pin or bolt 61 extends through a bolt hole in cross member 17 of arm 35 and through sleeve 60 to secure arm 55 to arm 35 for swinging movement of arm 55 relative to arm 35 about a substantially vertical pivot axis located at the rear end of arm 55.

Side members 57 and 58 are extended forwardly of the cross member 59 and these extensions 62 and 63 are provided at their forward ends with apertured enlargements 66 and 67. These apertured enlargements receive journal pins or bolts 68 and 69, respectively which extend through diametrically opposite apertures in an outer gimbal ring 70 positioned between the extensions 62 and 63. This provides freedom of tilting movement of the outer ring 70 about an axis perpendicular to the longitudinal center line of arm 55.

An inner gimbal ring 71 is disposed within the outer ring 70 and supported by journal bolts 72 and 73 carried by the outer ring. The bolts 72 and 73 are angularly spaced ninety degrees from the bolts 68 and 69 giving the inner ring 71 freedom of rocking movement about an axis perpendicular to the tilting axis of the outer ring and substantially in the same plane. The construction of the lift unit 12 connected to the frame arm 55 is the same as that of the lift unit 14, previously described in detail.

The arm 56 is of the same construction as the arm 55, having side members 75 and 76 diverging from a cylindrical bearing member 77 at the rear end of the arm, and a cross member 78 extending between the front ends of these members. This arm is braced by gusset plates 79 and 80 in the same manner as the arm 55, and side members 75 and 76 have forward extensions 81 and 82 provided at their forward ends with apertured enlargements which receive the bolts 83 and 84 securing the outer gimbal ring 85. The lift unit 13 connected to the forward end of the arm 56 by the gimbal ring assembly including the outer ring 85, is the same as the lift unit 14, as described above.

Lift units 12 and 13 may include ground wheels, as indicated at 107 and 106 respectively, to support the front end of the vehicle for towing of the vehicle and for other purposes. These wheels may swivel or have a caster action if desired.

The frame also includes a platform supporting subframe including a flattened, V-shaped structure extending transversely across the frame at approximately the midlength locations of the arms 55 and 56 and including the legs 90 and 91. These legs are rigidly joined together at their adjacent ends substantially on the longitudinal center line of the rear arm 35 and are also rigidly connected to the front ends of the side members 15 and 29 of the rear arm. A frame member 92 extends from the outer end of the leg 90 to the corresponding end of the cross member 17 of the rear arm and a frame member 93 extends from the outer end of the leg 91 to the corresponding end of the cross member 17. This subframe structure is made rigid by the reinforcing gusset plates 94, 95, 96 and 97, welded to the members at the corners of the subframe and the platform 11 is mounted on the legs 90 and 91 and the arm members 15 and 29 somewhat above the side members 57, 58, 75 and 76 of the forwardly extending arms 55 and 56. The frame leg 55 is held in its operative position, as shown in FIG. 1, by a bolt 100 which extends through a bolt hole in the subframe leg 90 and through a hole in a cross member 101 secured between the side members 57 and 58 of the frame leg. The frame leg 56 is similarly held in position by a bolt 102 which extends through a bolt hole in the subframe leg 91 and through a bolt hole in a cross member 103 extending between and secured to the side members 75 and 76 of the arm 56.

Figure 2:
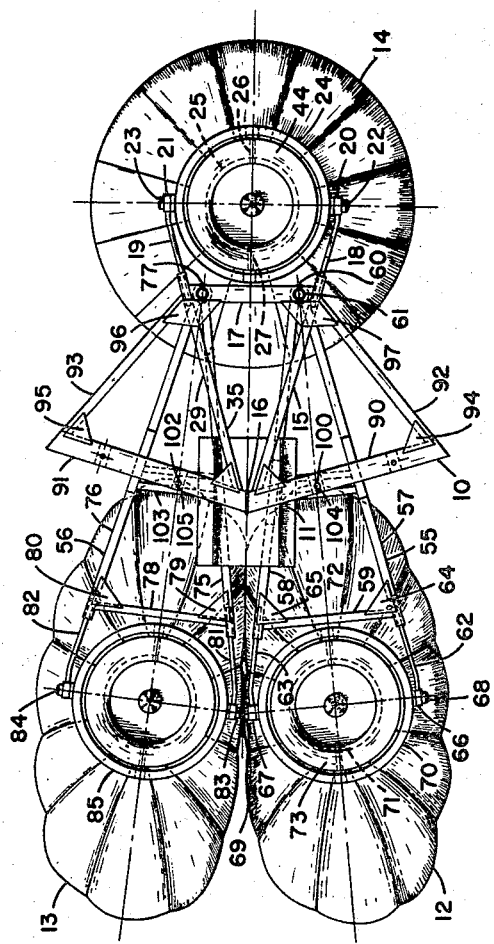
FIG. 2 is a top plan view of the vehicle with the vehicle folded for towing or other transportation.
Figure 5:
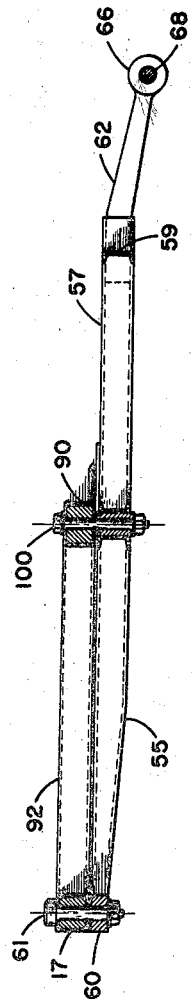
FIG. 5 is a cross sectional view of the vehicle frame taken substantially on a plane indicated by the line 5—5 of FIG. 1.

When the vehicle is conditioned for towing along the highway or for transportation by a suitable conveyance, such as a truck or railway car, the bolts 100 and 102 are removed and the frame arms 55 and 56 are swung together as shown in FIG. 2. The bolt 100 is then reinserted through a second bolt hole 104 in the subframe leg 90 and the bolt 102 is reinserted through a second bolt hole 105 in the subframe leg 91. When the vehicle is reduced to its inoperative condition the power driven fan units will, of course, be stopped so that the lift unit skirts will not be inflated. When the vehicle is prepared for towing or transportation the flexible skirts are furled by the use of suitable tricing lines, as will be later described.

An operator's seat 110 is mounted on the platform 11 and rearwardly of this seat the platform carries a vehicle propulsion unit, generally indicated at 112. The unit 112 comprises a vertical stand 113 including a stem 115 received at its lower end in a base 114 rigidly mounted on the rear portion of the platform. The stem 115 is rotatable or oscillatable about a vertical axis and carries on its upper end a small power plant 116, such as a low horsepower gasoline engine. The engine 116 drives a propeller 117, which is inclosed in a safety grid shield 118 and produces a rearwardly directed slipstream which imparts forward movement to the vehicle.

A steering column 120 is mounted on the platform in front of the seat 110 and carries a cable drum at its lower end. Steering cables 121 are connected by means of a crossbar 119 to the stem 115 so that the operator can direct the propeller slipstream to one side or the other to provide directional control for the vehicle. This directional control is also participated in by the rear ground wheel 39 which engages the ground with sufficient pressure to hold the rear end of the vehicle in line while the front end is steered.

The engine is also provided with a throttle in the usual manner, not illustrated, accessible to the operator for controlling the operation of the propeller driving engine. Preferably, the propeller 117 has mechanism for reversing or neutralizing its pitch so that the vehicle can be made to move backwardly or to idle in stationary position, when desired.

All of the lift unit skirts are provided with tricing lines for differentially controlling the side portions of the bottom edges of the skirts to provide or counteract lateral thrusts and for furling the skirts when the vehicle is prepared for towing or transportation. These tricing lines are particularly illustrated in FIGS. 6 and 7.

As shown in FIG. 7, each tricing line, as indicated at 137 for the rear lift unit 14, is secured at one end to the flat ring 49 which supports the upper end of the inner fabric wall 47. From its end secured to ring 49 the tricing line extends downwardly along the inner wall surface disposed inwardly of the skirt, under the bottom edge of the skirt and upwardly along the outer surface of the outer wall 46. Suitable rings 132 are attached to the inner and outer walls of the skirt and slidably receive the tricing line at intervals spaced apart along the line. Above the upper end of the outer wall of the skirt each tricing line is led through a pulley or fair lead, as indicated at 136. With this arrangement, by a limited pull of the tricing line beyond the associated fair lead the corresponding portion of the lower edge of the skirt is raised. By pulling on all of the lines associated with a particular skirt the entire skirt can be raised or furled and triced in furled condition.

Figure 6:
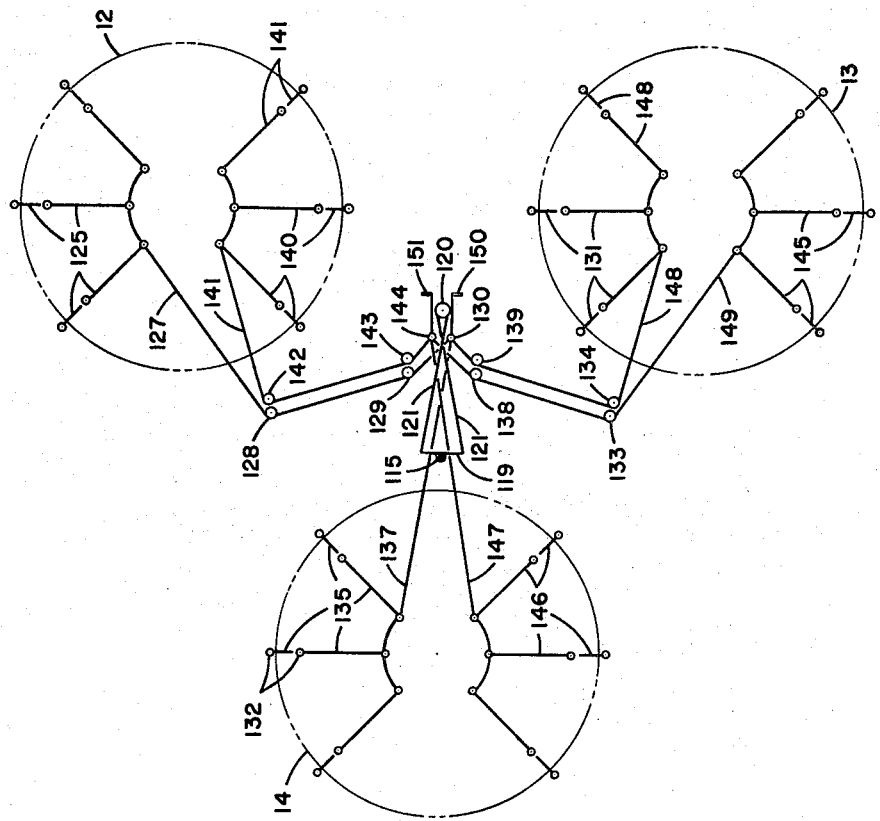
FIG. 6 is a diagrammatic plan view showing the vehicle control mechanism.

With the arrangement of skirts and tricing lines diagrammatically shown in FIG. 6, the lift unit 12 has at its outer or left hand side tricing lines 125 arranged at substantially uniform angular intervals around this side of the skirt of this unit. At their upper ends all of these tricing lines 125 are connected to a single line 127 which is carried around sheaves 128 and 129 and connected at 130 to the right hand foot pedal 150. The inner or right hand side of the skirt of unit 12 is provided with tricing lines 140 which are connected at their upper ends to a single line or cable 141 which is led around sheaves 142 and 143 and connected at 144 to the left hand foot pedal 151.

The foot pedals 150 and 151 are rockably mounted on platform 11, in front of seat 110 for forward movement by the operator.

Lift unit 13 has a set of tricing lines 131 on its inner or left hand side and a set of tricing lines 145 on its outer or right hand side. The lines of each set are connected at their upper ends to a single cable, as indicated at 148 and 149, and these cables are led around suitable sheaves 133, 134, 138 and 139. The cable 148 is connected to the right hand foot pedal 150 at 130 and the cable 149 is connected to the left hand foot pedal 151 at 144.

The rear lift unit 14 has two sets of tricing lines 135 and 146 on its left hand and right hand sides respectively. The lines 135 are connected to a single line or cable 137 and the lines 146 are connected to a single line 147. The cable 137 is connected at 130 to the right hand foot pedal 150 and the cable 137 is connected at 144 to the left hand foot pedal 151.

With this arrangement when the right hand foot pedal 150 is moved forwardly the outer side of the skirt of the unit 12, the inner side of the skirt of the unit 13 and the side of the skirt of the unit 14 adjacent the unit 12 will all be slightly raised to increase the air escape gap between these corresponding sides of the lift unit skirts and the supporting surface. This will cause an increased air flow from the left hand sides of the lift unit skirts, as viewed in FIGS. 1 and 6, causing the vehicle to shift laterally to the right. When the left hand foot pedal 151 is moved forwardly the bottom edges of the skirts at the right hand sides of the lift units will be slightly raised causing the vehicle to shift bodily to the left in the same manner. For furling the skirts all of the cables, 127, 141, 148, 149, 137 and 147 may be pulled in manually and secured.

When it is desired to have the vehicle carry a cargo load, a suitable pallet or container is placed directly below the platform 11 and is then raised to position against the under side of the platform by a suitable sling mechanism including depending cables 155 and 156 extending over sheaves, as indicated at 157 and 158, and wound on a suitable cable drum 159 supported by brackets attached to the platform.

Figure 8:
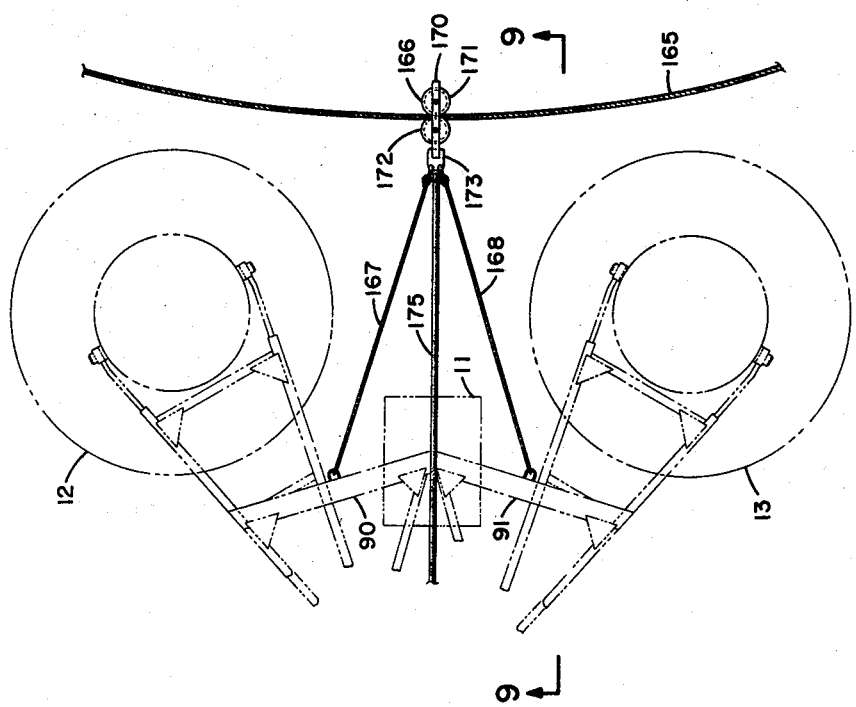
FIG. 8 is a fragmentary plan view showing mechanism for moving the vehicle along a stretched cable.
Figure 9:
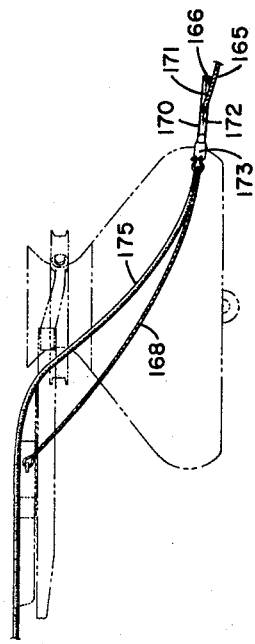
FIG. 9 is a fragmentary cross sectional view substantially on a plane indicated by the line 9—9 of FIG. 8.

Under certain conditions it will be desirable to have the vehicle move along a predetermined path on repeated trips. In such a case the vehicle will be guided by an outstretched cable, as indicated at 165 in FIGS. 8 and 9.

A traveler, generally indicated in 166, moves along the cable and is connected to the vehicle by harness cables 167 and 168 extending between the subframe legs 90 and 91 and the traveler 166.

The traveler comprises a frame 170 in which is journalled an idler sheave 171 riding along the side of the cable 165 remote from the vehicle and a drive sheave 172 riding along the side of the cable 165 adjacent the vehicle. Suitable means are provided for causing the sheaves to resiliently compress the cable between them to obtain frictional traction on the cable and the drive sheave 172 is driven in a well known manner by a pneumatic motor 173 mounted at the inner end of the frame 170 and drivingly connected to the sheave 172. Compressed air for operating the motor 173 is supplied through a flexible tube 175 connected at one end to the motor 173 and at its other end to a suitable air compressor, not illustrated, driven by the engine 116, or by any one of the lift unit engines, as may be desired.

By utilizing at least three lift units connected to a common frame in spaced apart relationship to each other and providing gimbal joint connections between the lift units and the frame, the lift units can swing to maintain their bottom edges parallel to the supporting surface regardless of the inclination of the frame and can also swing to maintain their bottom edges parallel to the supporting surface if the supporting surface slopes in either direction from the horizontal.

The pliable nature of the lift unit skirts permits obstacles to pass by the lift units as these skirts can be easily deformed and will resume their original shape as soon as the obstacle has been passed.

While an illustrative example of the invention has been shown in the accompanying drawings and described above, it is to be understood that the scope of the invention is not limited to the particular embodiment so illustrated and described but is commensurate with the scope of the appended claims and any equivalents or modifications coming within the scope of the claims are intended to be included in the scope of the invention.

I claim:

1. A lift unit for an air supported vehicle operating only within the region of ground effects and comprising a gimbal ring, a fan shroud mounted in said gimbal ring, a fan disposed in said shroud, a fan driving engine supported by said gimbal ring and carrying said fan, and a skirt of pliable material disposed below said fan and comprising a bell-shaped outer wall having its upper end surrounding and secured to said fan shroud, an inner wall having its upper end surrounding and secured to a portion of said engine below said fan, the radial distance between the upper ends of said walls being substantially equal to the length of the blades of said fan so that the air moved by said fan is forced into the annular space between the outer and inner walls of said skirt, partition member secured at their edges to said outer and inner walls and extending across the space therebetween to maintain said walls in predetermined spaced relationship to each other, an annular member secured at its outer and inner edges to the bottom edges of said outer and inner walls and having spaced apart nozzles therein for downwardly discharging air from the annular space between said walls, a web structure disposed within the lower portion of said inner wall providing a plurality of open end, vertical cells for reducing air turbulence in the lower portion of said skirt, and a wheel assembly supported by said gimbal ring and providing a ground engaging wheel at the bottom of the skirt.

2. A lift unit for an air supported vehicle operating only within the region of ground effects and comprising a gimbal ring, a fan shroud mounted in said gimbal ring, a fan disposed in said shroud, a fan driving engine supported by said gimbal ring and carrying said fan and a skirt of pliable material disposed below said fan and comprising a bell-shaped outer wall having its upper end surrounding and secured to said fan shroud, an inner wall having its upper end surrounding and secured to a portion of said engine below said fan, the radial distance between the upper end of said walls being substantially equal to the length of the blades of said fan so that the air moved by said fan is forced into the annular space between the outer and inner walls of said skirt, partition members secured at their edges to said outer and inner walls and extending across the space therebetween to maintain said walls in predetermined spaced relationship to each other, an annular member secured at its outer and inner edges to the bottom edges of said outer and inner walls and having spaced apart nozzles therein for downwardly discharging air from the annular space between said walls, and a web structure disposed within the lower portion of said inner wall providing a plurality of open end, vertical cells for reducing air turbulence in the lower portion of said skirt.

3. A lift unit for an air supported vehicle operating only within the region of ground effects and comprising a gimbal ring, a fan shroud mounted in said gimbal ring, a fan disposed in said shroud, a fan driving engine supported by said gimbal ring, and carrying said fan, a skirt of pliable material disposed below said fan and comprising a bell-shaped outer wall having its upper end surrounding and secured to said fan shroud, an inner wall having its upper end surrounding and secured to a portion of said engine below said fan, the radial distance between the upper ends of said walls being substantially equal to the length of the blades of said fan so that the air moved by said fan is forced into the annular space between the outer and inner walls of said skirt, partition members secured at their edges to said outer and inner walls and extending across the space therebetween to maintain said walls in predetermined spaced relationship to each other, and an annular member secured at its outer and inner edges to the bottom edges of said outer and inner walls and having spaced apart openings therein for downwardly discharging air from the annular space between said walls.

4. A lift unit for an air supported vehicle operating only within the region of ground effects and comprising a gimbal ring, a fan shroud mounted in said gimbal ring, a fan disposed in said shroud, a fan driving engine supported by said gimbal ring and carrying said fan, a skirt of pliable material disposed below said fan and constituting a bell-shaped plenum chamber having an outer wall surrounding and secured to said fan shroud at its upper end, an inner wall having its upper end surrounding and secured to a portion of said engine below said fan, the radial distance between the upper ends of said walls being substantially equal to the length of the blades of said fan so that the air moved by said fan is forced into the annular space between the outer and inner walls of said skirt, and partition members secured at their edges to said outer and inner walls and extending across the space therebetween to maintain said walls and the bottom edges thereof in predetermined spaced relationship to each other to provide air passages between said walls and into the interior of said inner wall to maintain a circulation of air at vehicle supporting pressure through said skirt.

5. A lift unit for an air supported vehicle comprising a gimbal ring, a fan shroud mounted in said gimbal ring, a fan disposed in said shroud, a fan driving engine supported by said gimbal ring and carrying said fan, a skirt of pliable material disposed below said fan and comprising an outer wall having its upper end surrounding and secured to said fan shroud, an inner wall having its upper end surrounding and secured to a portion of said engine below said fan, the radial distance between the upper ends of said walls being substantially equal to the length of the blades of said fan so that the air moved by said fan is forced into the annular space between the outer and inner walls of said skirt, and a perforated annular member secured at its outer and inner edges to the bottom edges of said outer and inner walls, said annular member being effective to provide an annular air jet impinging on the underlying ground surface to raise said lift unit above the ground and said inner wall constituting a bell-shaped open bottom plenum chamber to assist in maintaining said unit above the ground surface.

6. A lift unit for an air supported vehicle comprising a gimbal ring, a fan shroud mounted in said gimbal ring, a fan disposed in said shroud, a fan driving engine supported by said gimbal ring and carrying said fan, and a skirt of pliable material disposed below said fan and comprising an outer wall having its upper end surrounding and secured to said fan shroud, an inner wall having its upper end surrounding and secured to a portion of said engine below said fan, the radial distance between the upper ends of said walls being substantially equal to the length of the blades of said fan so that the air moved by said fan is forced into the annular space between the outer and inner walls of said skirt, said inner wall having suitably located openings therein for the passage of cooling air to said engine, and a foraminous annular member secured at its inner and outer edges to the bottom edges of said inner and outer walls and effective to provide an annular air jet impinging on the underlying ground surface, said inner wall constituting a bell-shaped plenum chamber receiving air from said air jet and from said engine cooling openings.

7. A lift unit for an air supported vehicle comprising a gimbal ring, a fan shroud mounted in said gimbal ring, a fan disposed in said fan shroud, a fan driving engine supported by said gimbal ring and carrying said fan, a skirt of pliable material disposed below said fan and comprising an annular outer wall having its upper end surrounding and secured to said fan shroud, an annular inner wall having its upper end surrounding and secured to a fixed structure immediately below said fan and concentric therewith, and means interconnecting the bottom edges of said walls and providing openings for the passage of air from the annular space between said walls, and tricing lines arranged at substantially equal angular intervals around said skirt for furling said skirt when said lift unit is inoperative.

8. In an air supported vehicle, a frame having at least three divergent arms, a lift unit under each of said arms and each comprising an outer gimbal ring rockably secured to the corresponding arm, an inner gimbal ring rockably mounted in said outer ring, a fan shroud mounted in said inner ring, a power driven fan disposed within said shroud, a skirt of pliable material depending from said shroud, and tricing lines arranged at angular intervals around said skirt and divided into two groups disposed one group at each side of said skirt, an operator's platform mounted on said frame, and vehicle control means mounted on said platform and including one or more control components so connected to said groups of tricing lines that the bottom edges of corresponding sides of all of said lift units can be raised simultaneously to assist in the directional control of said vehicle.

9. In an air supported vehicle, a frame having at least three divergent arms, a fan and plenum chamber type lift unit disposed below and secured to each of said arms, each lift unit having universally movable connection to the corresponding arm so that said lift units have freedom to assume different individual positions relative to said frame, and vehicle propulsion means mounted on said frames.

10. In an air supported vehicle, a frame having at least three divergent arms, a lift unit disposed below and connected to each of said arms, each of said lift units having a gimbal ring connection with the associated arm to enable said lift units to assume different individual positions relative to said frame and each lift unit having a skirt of pliable fabric material to facilitate passage of said lift units past obstructions in the path of said vehicle, a platform mounted on said frame, vehicle propulsion means mounted on said platform, and vehicle control means mounted on said platform and operatively connected to said propulsion means and said lift units.

11. In combination with an air supported vehicle having a frame, lift units operating in the region of ground effects supporting said frame and a power unit mounted on said frame, an outstretched cable, a power operated traveller movable along said cable, cables connecting said vehicle to said traveller for movement of said vehicle along said cable by said traveller, and means connecting said traveller to said power unit for supplying power to said traveller.

12. A mobile ground effects vehicle comprising a frame and at least three spaced apart lift units supporting said frame, each of said lift units comprising a gimbal ring assembly secured to said frame, a power driven fan carried by said gimbal ring assembly for forcing air downwardly relative to said frame, and a skirt of pliable material depending from said gimbal ring assembly and constituting an open bottom plenum chamber acting in ground effect to maintain a vehicle supporting air pressure between the plenum chamber and the underlying surface of the ground.

13. A mobile ground effects machine comprising a frame having mutually divergent arms and ground effects lift units secured to said frame one at the outer end of each arm, each of said lift units comprising a gimbal ring assembly secured to the corresponding arm, a fan shroud carried by the gimbal ring assembly, a fan-driving power plant carried by said fan shroud in position to force air downwardly relative to said frame, and a skirt of pliable material depending from said fan shroud and constituting a bell-shaped plenum chamber having an open bottom adapted to be closed by the underlying ground surface except for a marginal air escape gap of variable width effective to maintain a substantially constant air pressure in the plenum chamber.

References Cited by the Examiner

UNITED STATES PATENTS

| | | | |
|---|---|---|---|
| 657,330 | 9/00 | Chandler | 104—112 X |
| 979,228 | 12/10 | Quevedo | 104—112 |
| 1,123,589 | 1/15 | Porter | 180—1 |
| 2,514,822 | 7/50 | Wolfe | 244—2 |
| 2,819,684 | 1/58 | Nohr | 104—112 X |
| 2,876,965 | 3/59 | Streib | 244—52 X |
| 2,880,945 | 4/59 | Crane | 180—1 |
| 2,951,661 | 9/60 | Dorman et al. | 244—23 |
| 2,954,614 | 10/60 | Vogt | 244—23 |
| 2,969,032 | 1/61 | Pinnes | 180—1 |
| 2,981,501 | 4/61 | Schaefer | 244—23 X |
| 3,078,940 | 2/63 | Rolle | 104—112 X |
| 3,119,598 | 1/64 | Petersen et al. | 180—7 |

FOREIGN PATENTS

| | | |
|---|---|---|
| 219,133 | 11/58 | Australia. |
| 1,238,499 | 7/60 | France. |
| 1,251,967 | 12/60 | France. |

OTHER REFERENCES

Publication: "Popular Mechanics"; July 1957; pages 74–77.

MILTON BUCHLER, *Primary Examiner*.

PHILIP ARNOLD, A. HARRY LEVY, *Examiners*.